United States Patent [19]
Faure

[11] 3,874,491
[45] Apr. 1, 1975

[54] OMNIDIRECTIONAL ROLLER ASSEMBLY

[75] Inventor: Jean-Jacques Faure, Versailles, France

[73] Assignee: L'Etat Francais Delegation Ministerielle pour l'Armement Direction Technique des Armements Terrestres, Paris, France

[22] Filed: Jan. 18, 1972

[21] Appl. No.: 218,739

[30] Foreign Application Priority Data
Jan. 18, 1971  France .............................. 71.01516

[52] U.S. Cl............ 193/35 MD, 193/37, 198/127 R
[51] Int. Cl. ........................ B65g 13/00, B65g 13/06
[58] Field of Search ......... 193/35 MD, 37; 198/105, 198/127 R

[56] References Cited
UNITED STATES PATENTS
| | | | |
|---|---|---|---|
| 461,901 | 10/1891 | Allis............................... | 198/105 X |
| 3,269,502 | 8/1966 | Kornylak .......................... | 193/37 X |
| 3,363,735 | 1/1968 | Hotchkiss ............................ | 193/37 |
| 3,621,961 | 11/1971 | Stumpf................................. | 193/37 |
| 3,679,043 | 7/1972 | Becker ...................... | 193/35 MD X |

Primary Examiner—Evon C. Blunk
Assistant Examiner—W. Scott Carson
Attorney, Agent, or Firm—Stevens, Davis, Miller & Mosher

[57] ABSTRACT

This disclosure is a table having a plane work surface over which the flat surface of objects may be readily moved in any direction. The upper surface of the table has U channel members between which there are located rotatable bodies which bear thereon rotary rollers individually rotatable about axes normal to the axes of rotation of the bodies. The rollers have load engaging surfaces conforming to part of the surface of a sphere.

5 Claims, 8 Drawing Figures

OMNIDIRECTIONAL ROLLER ASSEMBLY

This invention relates to a roller assembly which when in contact with a plane surface enables relative movement between the surface and the assembly in any optional direction in or parallel to the plane of contact. Such an assembly can be fitted to a conveyor or run-out table to permit the ready displacement in any desired direction on the table of loads having at least one substantially plane face, or can be fitted to a load itself.

In commerce or industry, conveyor handling or run-out tables are frequently used which are equipped with uniformly spaced, roller elements on which, with a minimum of effort, it is possible to displace loads having at least one plane surface. In known tables of this kind, the roller elements are often cylindrical rollers rotatably mounted on the table by means of pivots, which are parallel. In such known tables, only movement of loads perpendicular to the axes of rotation of the rollers requires a minimum of effort and it is difficult to effect displacements in any optional direction.

One known table permitting the displacement of loads in any optional direction has rollers mounted on flanges or yokes orientable about a vertical pivot which does not coincide with the axis of rotation of the roller. In a table of this kind, when the load is displaced in a predetermined direction, each roller on which the load bears is required to pivot first of all about its vertical axis in order to be aligned in the direction of displacement. The result is a lateral off-centering of the load corresponding to the eccentricity of the roller relatively to the vertical axis. Such off-centering results in a swaying or rocking movement of the load which hinders precise manipulation and, due to the random orientation of the various rollers concerned, a certain degree of sliding of the rollers on the load before correct orientation thereof.

A further known table has roller elements constituted by spherical elements made from steel or plastic material and mounted in bearings which are also spherical, the rotation of the spherical elements about an optional axis being facilitated by a layer of small steel balls circulating freely in the bottom of the bearing. Such roller elements have the disadvantage, when the spherical elements are made from steel, that they mark, with a spherical imprint, loads the travel surface of which is made from a material which is not very hard or, when the spherical elements are made from a plastic material, that they are able to withstand only a load of low weight.

It is an object of the present invention to provide an omnidirectional roller assembly which obviates the disadvantages of the foregoing arrangements.

Accordingly the present invention provides an omnidirectional roller assembly which, when in contact with a plane surface, enables relative movement between the surface and the assembly in any optional direction in or parallel to the plane of contact, said assembly including a cylindrical or prismatic body connectible by a shaft and bearings to a support, which shaft and bearings enable the body to rotate relative to its longitudinal axis, and a plurality of identical rotary means on the body, the axis of rotation of each rotary means being perpendicular to and concurrent with the longitudinal axis of the body, the external surface of each rotary means for contact with said plane surface being a portion of a sphere centered on the point of convergence of the axes and limited by two planes perpendicular to the rotational axis of the rotary means, and the number, arrangement and spherical radius of the rotary means being such that each of the generatrices of the cylindrical enveloping surface of the omnidirectional roller assembly is tangential to the spherical surface of at least one rotary means.

A roller assembly of the invention when fitted to a conveyor or run-out table permits the displacement of loads in any optional direction on the table substantially without frictional hindrance. Furthermore each rotary element is able to support a load of relatively high weight. Also the bulk of the roller assemblies and the mode of securing the roller assemblies in a table is similar to the bulk and the mode of securing the equivalent permissible load cylindrical rollers. The portions of the loads contacting a roller assembly of the invention may be made of plastics or rubber material without the permissible load being affected thereby, and such a roller assembly may be driven so as to impart a predetermined velocity component to the displacement of the loads.

The arrangement, number and spherical radius of the rotary means are such that there is always at least one rotary means contacting the plane surface of the load when the latter is displaced in any optional direction.

For a better understanding of the operation of the omnidirectional roller assembly of the invention consideration should first of all be given to two particular directions of displacement of a load thereon:

a. Perpendicular to the axis of the body. In this case, the load bearing on the rotary means drives the roller assembly in rotation about the longitudinal axis of the body without rotation of the rotary means about their own axes;

b. Parallel to the axis of the body. The load only drives in rotation the rotary means which it contracts, without there being any rotation of the body about its longitudinal axis.

If a load on the roller assembly is displaced in any optional direction, the body and the rotary means rotate simultaneously about their respective axes, the rotation of each corresponding to the two movement components according to the directions perpendicular and parallel to the axis of the body.

An omnidirectional roller assembly according to the invention makes it possible to control the movement component perpendicular to the axis of the body, coupling the said body with drive means.

The rotary means may be arranged on the body in at least two groups each of which comprises three said rotary means the axes of which are concurrent and perpendicular to the axis of the member or body and enclose between them angles of 120°, the axes of one group of rotary means and of the adjacent group being angularly offset by 60°.

Alternatively the rotary means may be arranged on the body in at least three groups, each group comprising two rotary means mounted symmetrically relatively to the axis of the body, and the axes of the one group being angularly offset by 60° relatively to the axes of the adjacent group.

For a better understanding of the present invention and to show how the same may be carried into effect, reference will now be made, by way of example, to the accompanying drawings, in which.

Figure 1:
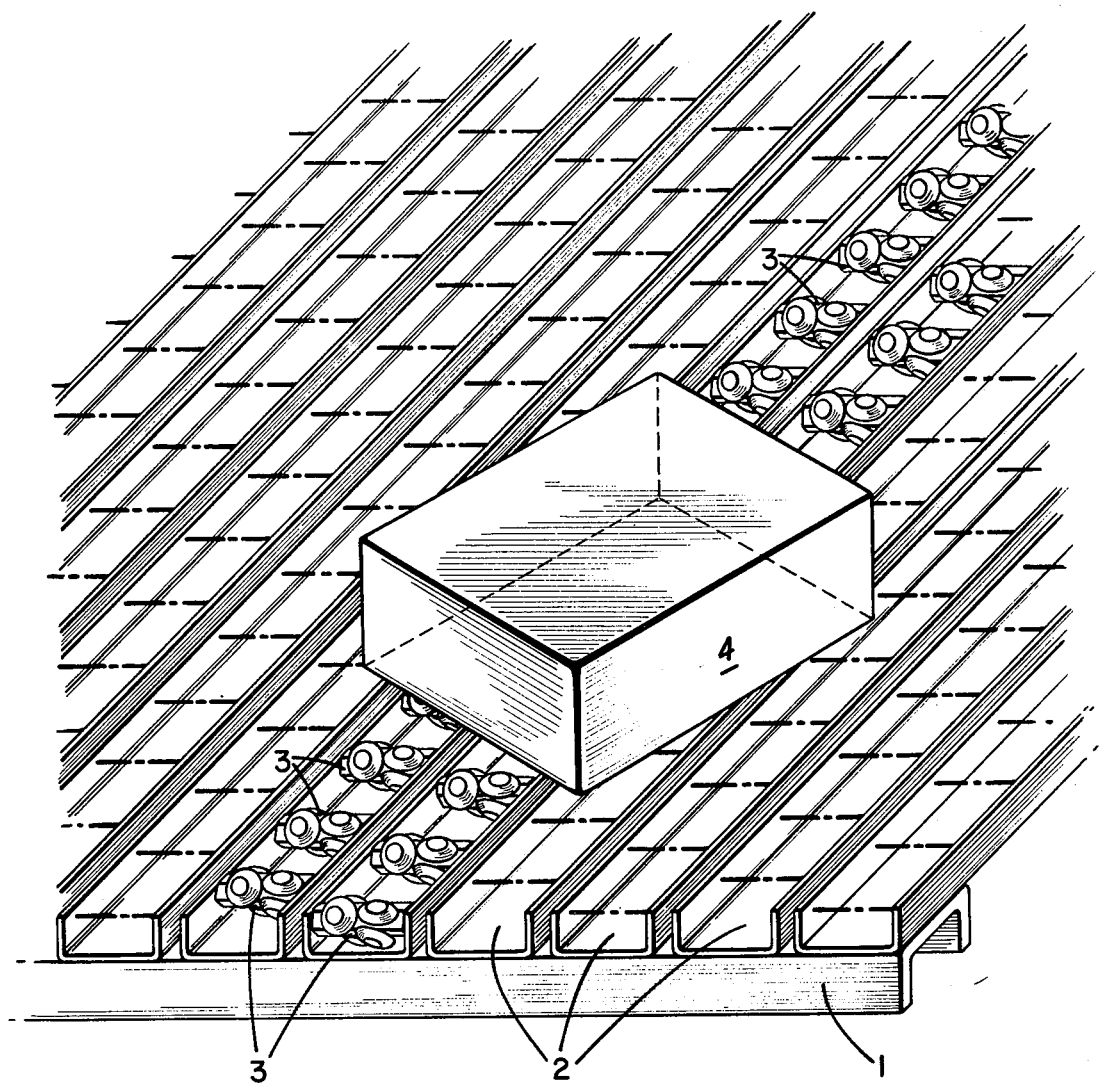
FIG. 1 is a perspective view of a portion of conveyor or run-out table equipped with series of omnidirectional roller assemblies according to one embodiment of the invention on which is or are displaced one or more loads or packages in any optional horizontal direction.
Figure 2:
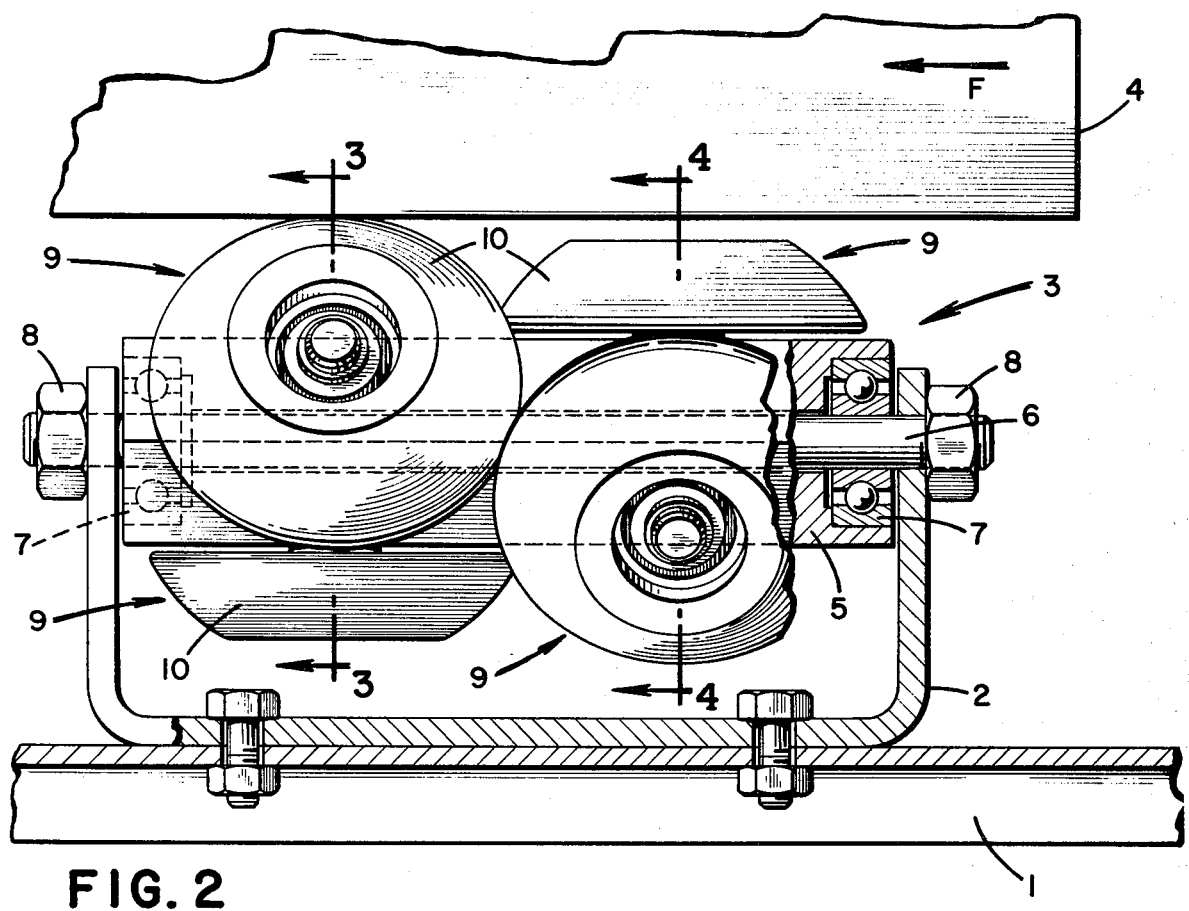
FIG. 2 is a cross-sectional view through part of the table illustrated in FIG. 1, showing a partially sectioned omnidirectional roller assembly according to said one embodiment.
Figures 3, 4:
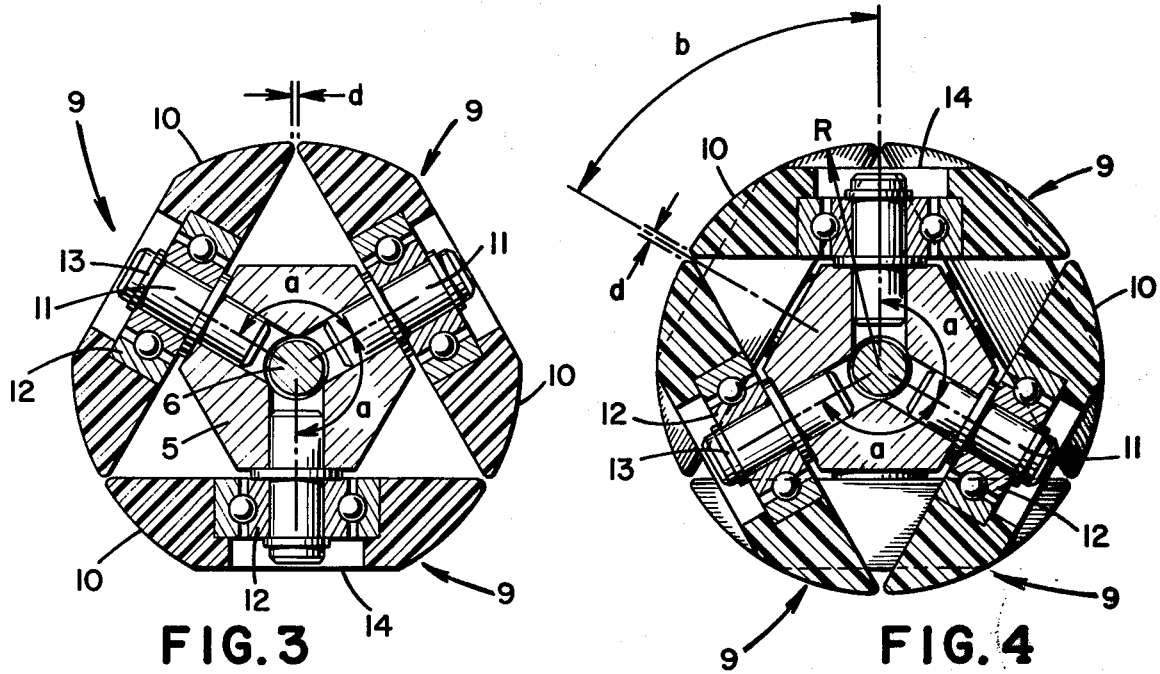
FIG. 3 is a sectional view of a roller assembly taken on the line 3—3 of FIG. 2.
FIG. 4 is a sectional view of a roller assembly taken on the line 4—4 of FIG. 2.

Referring now to FIGS. 1 to 4 of the drawings, a handling, conveyor or run-out table shown in FIG. 1, comprises an assembly of transverse bearers 1 of inverted U-section, supporting a number of supports 2, which are U-shaped in section and arranged with their open mouths directed upwardly of the bearers 1. A series of roller assemblies 3 according to a first embodiment of the invention and as shown also in FIGS. 2 to 4 is installed in each support 2, with some of the roller assemblies 3 being shown in FIG. 1 and the others indicated by means of their axes in dotted lines in FIG. 1. The assemblies 3 serve for the displacement of a load 4 on the table. A roller assembly 3 of the invention, according to the embodiment of FIGS. 1 to 4 has a cylindrical or prismatic body, in this case a hexagonal body 5, rotatably mounted on a shaft 6 via two antifriction bearings 7. The shaft 6 has two screw-threaded ends which are passed through apertures in opposed limbs of a support 2 and which receive two nuts 8 securing the assembly 3 on the support 2. Each assembly 3 includes a number of identical rotary means on the body 5, in this case six identical rotary means 9, each having a roller 10 made from plastic material, the external spherical surface (radius R) of which is centered on the longitudinal axis of the body 5, a pivot 11 screwed or stuck into a seating perpendicular to the body 5 and supporting the roller 10 through the intermediary of an antifriction bearing 12, and a resilient keeper 13 maintaining the inner race of the antifriction bearing 12 on the pivot 11. The six means 9 form two groups, each being shown respectively in the sections 3—3 and 4—4 of FIGS. 3 and 4. In the section 3—3, the three pivots 11 are concurrent and perpendicular to the axis of the body 5, enclosing between them angles $a$ equal to 120°, and the same applies to section 4—4. Furthermore, the axes 11 in section 4—4 are offset through the angle $b = 60°$ relative to the corresponding axes in the section 3—3.

A flat 14 is formed on each of the rollers 10. If there was no flat 14, with the roller assembly in the configuration shown in FIGS. 2, 3 and 4 and the load assumed being displaced in the longitudinal direction F, the upper roller 10 of FIG. 4 would rub, without rolling, under the load.

A small gap $d$ (FIGS. 3 and 4) makes it possible to prevent contact between the rollers 10.

Figure 5:
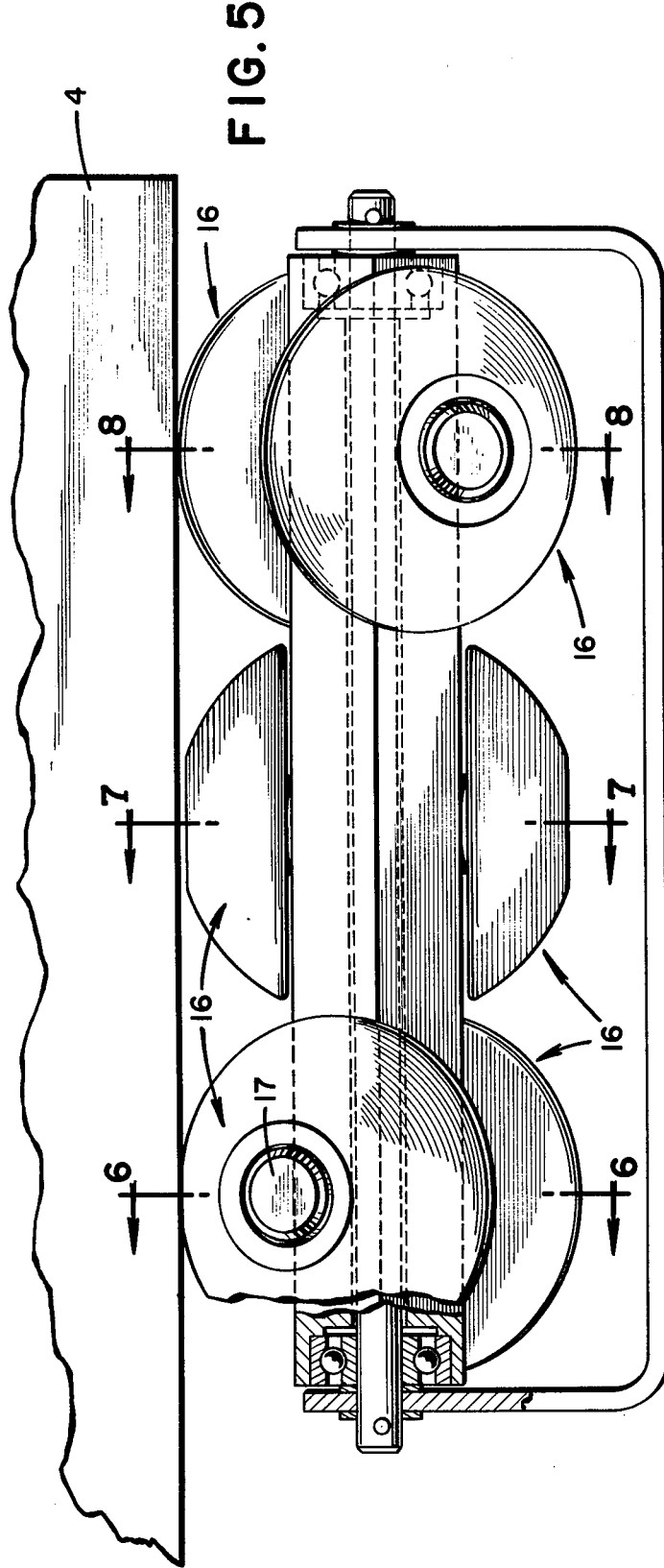
FIG. 5 is a cross-sectional view through a part of a table similar to that of FIG. 1, showing a partially sectioned omnidirectional roller assembly according to a second embodiment of the invention.
Figure 8:
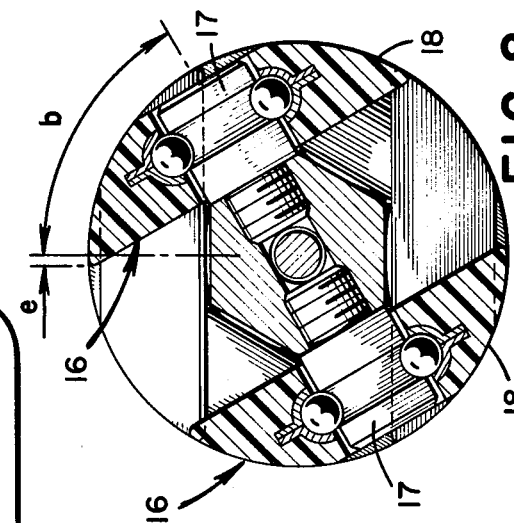
FIG. 8 is a sectional view of a roller assembly taken on the line 8—8 of FIG. 5.
Figure 7:
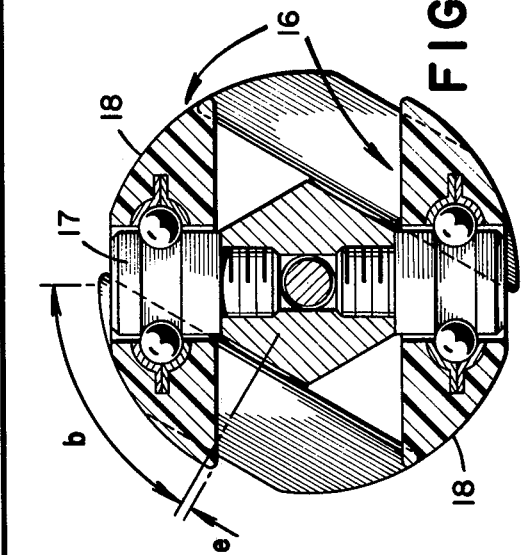
FIG. 7 is a sectional view of a roller assembly taken on the line 7—7 of FIG. 5.
Figure 6:
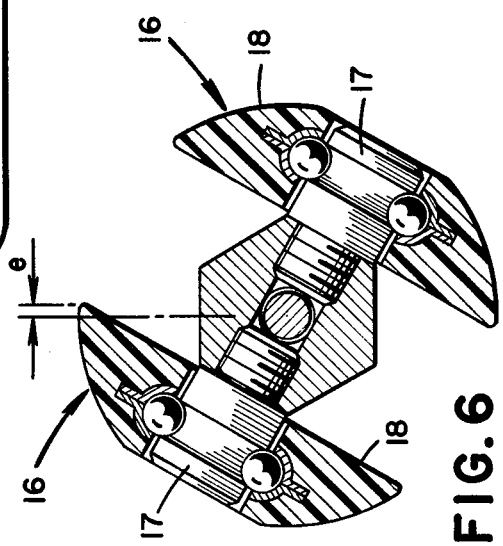
FIG. 6 is a sectional view of a roller assembly taken on the line 6—6 of FIG. 5.

FIGS. 5, 6, 7, and 8 show a roller assembly according to a further embodiment of the invention. FIG. 5 is a cross-sectional view similar to FIG. 2 through a support 15 in which is arranged an omnidirectional roller assembly serving for the displacement of the load 4. The roller assembly of FIGS. 5 to 8 has the following differences relative to the one previously described:

Six rotary means 16 are disposed in three groups each comprising a pair of means disposed symmetrically relatively to the longitudinal axis of the body. Each group is respectively illustrated in the sections 6—6, 7—7, 8—8 of FIGS. 6, 7, 8. The axes 17 of the rollers 18 of the means 16 in section 7—7 are offset by the angle $b = 60°$ relatively to the axes 17 in sections 6—6. Similarly, the axes 17 in section 8—8 are offset by $b = 60°$ relative to axes 17 in section 7—7. This arrangement affords, as compared with the one previously described, the advantage that it covers the spherical surfaces of the rollers. In fact, if FIGS. 6 and 8 are taken as examples, it will be seen that the edges of the two upper rollers 18 extend on either side by a distance $e$, beyond the vertical axis extending through the point of intersection of the axis of the rollers and axis of the roller assembly body. FIGS. 6, 7, 8 show a construction of rotary means 16 differing from that of rotary means 9 as shown in FIGS. 3 and 4. These two constructions are shown purely by way of example.

The omnidirectional roller assembly according to the invention may be fitted to handling tables permitting the displacement of all kinds of loads having at least one face, in conveyor-belt manufacture, railway stations, warehouses, or on vehicles, particularly when precise orientation of such loads is necessary, and also for the positioning of heavy objects, the feeding of machine tools, and/or the introduction of long loads into a vehicle.

It is possible to design handling tables equipped only with omnidirectional rollers assemblies of the invention, but it is equally possible to design tables of "mixed" construction having, for example, conventional rollers and omnidirectional roller assemblies, the latter being disposed in those zones in which it is necessary to effect changes in direction of a load.

The omnidirectional roller assembly according to the invention makes it possible, as already stated, to control the component of the movement perpendicular to the axis of the body, coupling the body to drive means, and also the further component if care is taken to dispose a plurality of roller assemblies with their axes non-parallel.

The omnidirectional roller assembly of the invention may alternatively be secured to a load itself to permit any displacement on a plane surface.

The body of the omnidirectional roller assembly may receive identical rotary means constituted by wheels fitted with pneumatic tires.

What is claimed is:

1. An omnidirectional roller assembly which enables relative movement of a plane surface in contact therewith in any optional direction in or parallel to the palne of contact of said surface and assembly, said roller assembly comprising: a support member; a main body member; a shaft and bearing means mounting said main body member on said support member for rotation about the longitudinal axis of said main body member;

and a plurality of substantially identical rotary members rotatably mounted on said main body member, each rotary member having a bearing surface for contacting said plane surface, said bearing surface being a portion of an imaginary sphere centered on the intersection of the axes of rotation of the rotary member and said main body member, said portion of said sphere being defined between two spaced apart planes substantially perpendicular to the axis of rotation of said rotary member and cutting said sphere; wherein said rotary members are arranged in at least two adjacent groups on said main body member, each group comprising the same number of rotary members, and wherein within each group the axes of rotation of said rotary members are all coincident at the axis of rotation of said main body member, the axes of rotation of the rotary members in any given group being spaced from each other at substantially equal angular intervals about the axis of rotation of said main body member; the spherical radius of the bearing surfaces of each rotary means of each group being such that, in an imaginary circular cylindrical surface having a radius equal to the spherical radius of said bearing surfaces and having its axis coincident with the rotational axis of said main body member, substantially any straight line in the cylindrical surface lying parallel to the axis of the cylindrical surface is tangential to at least one of said bearing surfaces.

2. The omnidirectional roller assembly according to claim 1, wherein said plurality of rotary members are substantially uniformly spaced apart on said main body member.

3. The omnidirectional roller assembly according to claim 1, wherein said plurality of rotary members are arranged in at least two adjacent groups, each group comprising three of said rotary members, the axes of rotation of said three members in each group being spaced apart approximately 120° from each other and offset approximately 60° from the corresponding axes of rotation of the members of the adjacent group.

4. The omnidirectional roller assembly according to claim 1, wherein said plurality of rotary members are arranged in at least three adjacent groups, each group comprising two of said rotary members, the axes of rotation of said two members in each group being spaced apart approximately 180° from each other and offset approximately 60° from the corresponding axes of rotation of the members of the next adjacent group.

5. The roller assembly according to claim 1, wherein said main body member has a hexagonal cross-section, said plurality of rotary members being mounted on corresponding planar surfaces of said hexagonally shaped main body member.

* * * * *